May 5, 1925.  
H. H. VICKERS  
TYPEWRITING MACHINE  
Filed Feb. 3, 1923  
1,537,048
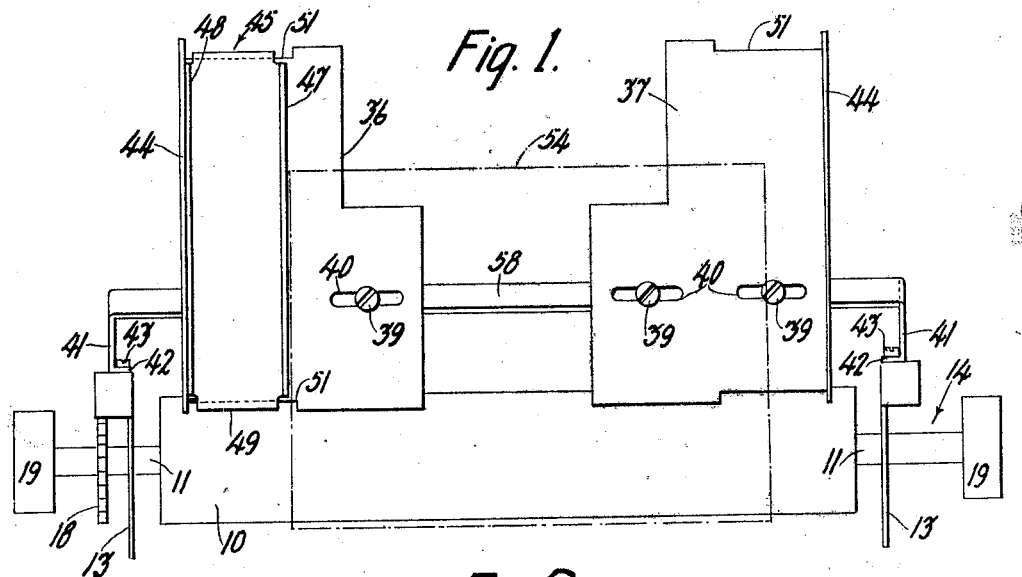
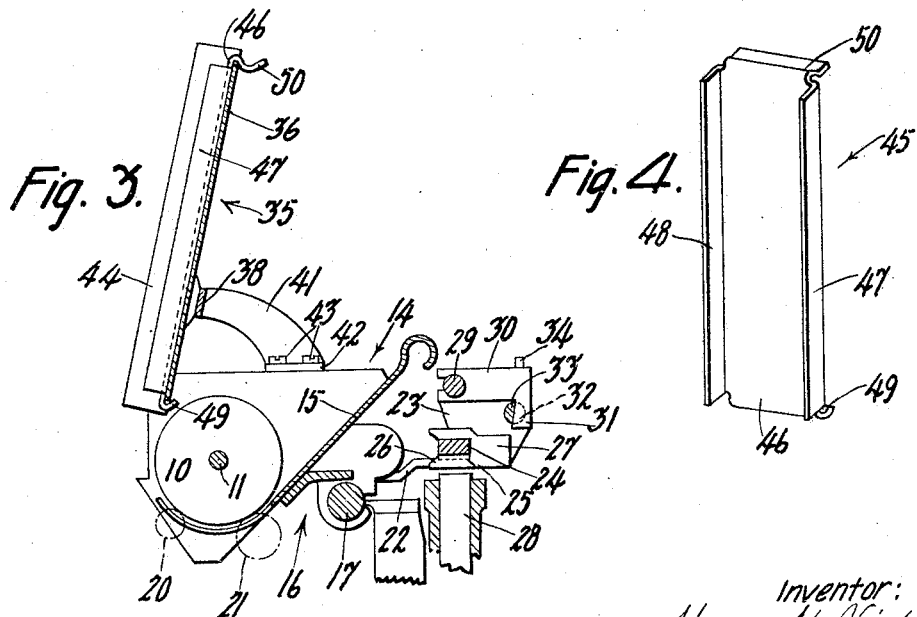
Inventor:
Harry H. Vickers
by B.C. Stickney
Attorney Patented May 5, 1925.

1,537,048

UNITED STATES PATENT OFFICE.

HARRY H. VICKERS, OF CORONA, NEW YORK, ASSIGNOR TO UNDERWOOD TYPEWRITER COMPANY, OF NEW YORK, N. Y., A CORPORATION OF DELAWARE.

TYPEWRITING MACHINE.

Application filed February 3, 1923. Serial No. 616,654.

*To all whom it may concern:*

Be it known that I, HARRY H. VICKERS, a citizen of the United States, residing in Corona, Long Island, in the county of Queens and State of New York, have invented certain new and useful Improvements in Typewriting Machines, of which the following is a specification.

This invention relates to collating devices, and is herein illustrated as applied to an Underwood bookkeeping machine, such, for example, as that shown in the patent to Minton, No. 1,280,065, dated September 24, 1918.

In machines of the class referred to, denomination-selectors are set at different positions along the carriage to determine computing zones, and tabulator-stops are set at corresponding positions. In case subtraction is to be effected in certain zones, the machine may be set for subtraction manually, or the tabulator-stops for such zones may be provided with means, such as disclosed in said patent, for setting the machine for subtraction.

In certain classes of work it is necessary, at different times, to make the corresponding sets of entries in different columnar positions on a single work-sheet or on different work-sheets. If such work-sheets were in each case gaged in the same way by collating means at the delivery side of the platen, it would be necessary to reset the denomination-selectors and tabulator-stops frequently. Such resetting would require considerable time and great care, and would tend to cause mistakes. To obviate these difficulties, it has been proposed to secure the desired results by positioning the work-sheets differently by suitable collating devices, so that the columns on the work-sheets collated will be properly positioned with reference to the computing zones.

As herein disclosed, provision is made of a collating table or chute having side-edge gages so positioned that a single work-sheet may be properly positioned relatively to the denomination-selectors by positioning it at one time against one side-edge gage and at another time against the other side-edge gage, or, in case of the use of two different kinds of work-sheets, that a work-sheet of one kind may be properly positioned by one side-edge gage and a work-sheet of the other kind by the other side-edge gage. It will be seen that this arrangement makes it possible to position a work-sheet with either one of two columnar portions in proper relation to the computing zones without any change in the position of the selectors or of the collating devices.

A feature of the invention consists in the provision of a detachable side gage to be mounted on the collating table for use in positioning a work-sheet which cannot be properly positioned by the side gages at the edges of the collating table. The detachable side gage is so constructed and proportioned that, when it is placed on the collating table and moved against one of the fixed side gages, it will be in proper gaging position.

Preferably, the detachable side gage comprises a plate to rest on the collating table, and of proper width to determine the position of the side gage with relation to one of the fixed gages, the plate being provided with a hook at one end to fit over the edge of the collating table and a spring finger or hook at the other end to press against the other edge of the collating table. The detachable side gage will be held frictionally against movement along said table, but may be shifted against such frictional resistance to different positions of adjustment. The plate may be provided with upstanding flanges at both edges to adapt it for use at both sides of the collating table. The collating table may be notched at the edges to be engaged by the detachable side gage, so that the ends of the side gage will be flush with the edges of the collating table.

It will be seen that the detachable side gage may be used with the fixed gages to position a single work-sheet in three different positions.

Other features and advantages will hereinafter appear.

In the accompanying drawings,

Figure 1 is a front elevation showing the invention applied to the carriage of an Underwood bookkeeping machine.

Figure 2 is a view of the collating table looking down at the upper edge thereof.

Figure 3 is a sectional side elevation of the structure shown in Figure 1 and some additional parts.

Figure 4 is a perspective view of the detachable side gage.

A platen 10 is mounted on an axle 11 journaled in the ends 13 of a platen-frame 14, comprising a rear paper-table 15 and forming a part of a carriage 16 supported at its rear on a rail 17 for movement transversely of the machine. The platen 10 may be actuated by line-space mechanism, including a ratchet-wheel 18 fixed on the axle 11, or by means of finger-wheels 19 on the ends of said axle 11, to feed work-sheets held against the platen by means of front and rear feed-rolls 20 and 21, respectively, running on the bottom of the platen.

Provision is made, at the rear of the carriage, of brackets 22, supporting plates 23, in which are mounted the ends of a bar 24 having teeth 25 at letter-space intervals, thereby forming notches to receive the lower portions 26 of the forked ends of tabulator-portions or column-stops 27, to co-operate with counter-stops 28 in positioning the carriage. Mounted also in the plates 23 is a rod 29, on which denomination-selectors 30 are mounted, for swinging and sliding movement, each selector 30 being held in any letter-space position to which it has been set, by means of teeth 31 engaging in notches 32 of a rod 33, also mounted in said plates 23. The denomination-selectors 30 are positioned along the rods 29 and 33, to determine computing zones, and the column-stops 27 are arranged at corresponding positions on the carriage, so that the carriage may be tabulated from one computing zone to another. In passing through a computing zone, a dog 34, projecting upwardly from a denomination-selector 30, engages seriatim a set of denominational jacks (not shown).

To position work-sheets with reference to the computing zones, provision is made of a collating table 35 at the delivery side of the platen, said table 35 comprising left and right sections 36 and 37, respectively, adjustably secured to a transverse bar 38, by means of screws 39 passing through slots 40 in said sections 36 and 37 and threaded into said bar 38. Preferably, the bar 38 is supported on the ends 13 of the platen-frame 14, by providing the bar 38 with downturned ends 41 having at their lower ends inwardly-extending flanges 42, through which pass screws 43, threaded into the upper portions of the ends 13 of the platen-frame.

When the sections 36 and 37 are properly positioned for the work-sheets to be used in connection therewith, one of such work-sheets may be positioned relatively to the denomination-selectors 30, by gaging its left edge at one time by means of a permanent side-edge gage 44 on the left section 36, and at another time by gaging it against a permanent side-edge gage 44 on the right section 37 of the collating table 35. Instead of gaging the same work-sheet differently at different times, the gages 44 may be used to gage different kinds of work-sheets. In certain cases, work-sheets, having columns to correspond with the computing zones, cannot be properly gaged by either of the side gages 44. According to the present invention, this difficulty may be met by providing a detachable temporary side gage 45, comprising a base or plate 46 to rest on the collating table and upstanding flanges 47 and 48 for use as left or right side gages, respectively, in accordance with the positioning of the detachable side gage 45 at the left end of the collating table or at the right end.

To hold the detachable side gage 45 on the collating table 35, the base 46 of the gage 45 is provided, at its lower end, with a hook 49, to engage the lower edge of the collating table, the hook being so shaped as to hold the gage 45 close against the collating table when the gage is drawn upwardly. Projecting rearwardly from the upper end of the base 46 is a spring-finger 50, bent downwardly to form a hook to engage the upper edge of the collating table, and then upwardly towards its outer end, so that, when the hook 49 is placed in engagement with the lower edge of the table, and the gage 45 is swung toward the collating table, the spring-finger 50 will be cammed outwardly to permit the gage 45 to be brought into contact with the collating table, and will then be released to engage the collating table at its rear face, and hold the gage 45 frictionally in position.

Preferably, as shown in Figure 1, the sections 36 and 37 of the collating table are provided with notches 51 at their upper and lower edges, so that, when the hook 49 and spring-finger 50 engage the collating table at the bottom of said notches, the ends of the gage 45 will be substantially in alignment with the edges of said sections 36 and 37 at one side of the notches. It will be seen that the notches 51 are of such length as to permit some adjustment of the gage 45, so that it may readily be snapped on the collating table at either end and moved into engagement with the adjacent side gage 44, thereby mechanically locating the temporary gage, while the permanent side gages 44 remain undisturbed.

The manner of gaging different work-sheets is illustrated in Figure 2, in which work-sheet 52 is shown as gaged by the left-side gage 44, work-sheet 53 is shown as gaged by the right-side gage 44, and work-sheet 54 is shown as gaged by the temporary or detachable side gage 45. It should be understood that when said three work-sheets are so gaged, the computing columns thereon have the same positions relative to the computing zones determined by the computing mechanism. The work-sheet 54 is also indicated in gaged position in Figure 1.

Variations may be resorted to within the scope of the invention, and portions of the improvements may be used without others.

Having thus described my invention, I claim:

1. In a combined typewriting and computing machine comprising a platen and computing mechanism effective for certain zones along the platen, the combination with a collating table having fixed side-edge gages for use separately to position computing columns on work-sheets in coincidence with said computing zones, of a detachable side gage so constructed that, when placed on the collating table adjacent one of the fixed gages and pressed thereagainst, it may be used to position, relatively to said computing zones, a special work-sheet which cannot be properly positioned by the fixed gages.

2. In a combined typewriting and computing machine comprising a platen and computing mechanism effective for certain zones along the platen, the combination with a collating table having fixed side-edge gages for use separately to position computing columns on work-sheets in coincidence with said computing zones, of a detachable side gage so constructed that, when placed on the collating table adjacent one of the fixed gages and pressed thereagainst, it may be used to position, relatively to said computing zones, a special work-sheet which cannot be properly positioned by the fixed gages, and detent means to hold the detachable gage on the collating table and to resist frictional movement along said collating table, said detent means comprising a hook on one end of said detachable gage to engage over one edge of the collating table, and a spring detent at the other end to engage over the opposite edge of the collating table, said table having notches so that the hook and spring detent may lie therein and that their outer faces may be substantially flush with the edges of the collating table.

3. In a combined typewriting and computing machine comprising a platen and computing mechanism effective for certain zones along the platen, the combination with a collating table having fixed side-edge gages for use separately to position computing columns on work-sheets in coincidence with said computing zones, of a detachable side gage so constructed that, when placed on the collating table adjacent one of the fixed gages and pressed thereagainst, it may be used to position, relatively to said computing zones, a special work-sheet which cannot be properly positioned by the fixed gages, said detachable gage comprising a central portion to rest on the collating table and an upright flange at each end to adapt it for use at both sides of the collating table.

4. In a combined typewriting and computing machine comprising a platen and computing mechanism effective for certain zones along the platen, the combination with a collating table having fixed side-edge gages for use separately to position computing columns on work-sheets in coincidence with said computing zones, of a side gage having means for attaching it to the collating table, in a manner permitting it to be moved against one of the fixed gages, where it will serve to gage a special sheet.

5. An attachment for a collating table, said attachment comprising a plate having at its ends means to engage the upper and lower edges of the collating table to hold the plate in position on the collating table, and a side gage at each edge of the plate to adapt it for use at either side of the collating table.

6. In a typewriting machine, the combination with a paper-table, of a detachable side gage having at one end a hook to engage one edge of the paper-table and at the other end a yieldable hook to engage the other edge of the paper-table, the paper-table being provided at its edges with notches to receive said hooks so that the ends of said detachable side gage will be substantially flush with the edges of the paper-table.

7. In a typewriting machine, the combination with a paper-table, of a detachable side gage having at one end a hook to engage one edge of the paper-table and at the other end a yieldable hook to engage the other edge of the paper-table, the paper-table being provided at its edges with notches to receive said hooks so that the ends of said detachable side gage will be substantially flush with the edges of the paper-table.

8. A detachable side gage for use on a collating table, comprising a plate to rest on the collating table, a hook at one end to engage one edge of the collating table, and a spring-hook at the other end of the plate to engage the collating table at the opposite edge, and to co-operate with the first hook to hold the side gage firmly in position on the collating table, said spring-hook having an elongated end inclined so as to be pressed to one side when the plate is pressed against the table, and to snap back of the adjacent edge of the table when the plate is brought into engagement with the face of the collating table.

9. In a typewriting machine, the combination with a platen, of a sheet-collating table having opposite permanent side-edge gages for the work-sheets, and a mechanically locatable temporary side-gage device substitutable for either of the permanent side gages thereon, for temporarily gaging special work-sheets while the permanent side gages remain undisturbed, said temporary side gage having a plate-portion resting upon the table, and means detachably connecting it to the table.

10. In a typewriting machine, the combination with a platen, of a sheet-collating table having opposite permanent side-edge gages for the work-sheets, and a mechanically locatable temporary side-gage device substitutable for either of the permanent side gages thereon, for temporarily gaging special work-sheets while the permanent side gages remain undisturbed, said temporary side gage having a plate-portion resting upon the table and having parallel sides, one side for placing against a permanent side gage, for mechanically locating the temporary gage device, and the other side gaging the temporary work-sheet, and means detachably connecting it to the table.

HARRY H. VICKERS.

Witnesses:
EDITH B. LIBBEY,
JENNIE P. THORNE.